US011122012B2

(12) United States Patent
Dickson

(10) Patent No.: US 11,122,012 B2
(45) Date of Patent: *Sep. 14, 2021

(54) LICENSE UTILIZATION MANAGEMENT SYSTEM SERVICE SUITE

(71) Applicant: The Boeing Company, Chicago, IL (US)

(72) Inventor: Richard Jesse Dickson, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1258 days.

This patent is subject to a terminal disclaimer.

(21) Appl. No.: 15/426,046

(22) Filed: Feb. 6, 2017

(65) Prior Publication Data

US 2017/0149746 A1   May 25, 2017

Related U.S. Application Data

(62) Division of application No. 12/903,612, filed on Oct. 13, 2010, now Pat. No. 9,563,751.

(51) Int. Cl.
*H04L 29/06* (2006.01)
*H04L 29/08* (2006.01)

(52) U.S. Cl.
CPC ...... *H04L 63/0428* (2013.01); *H04L 63/0846* (2013.01); *H04L 63/123* (2013.01);
(Continued)

(58) Field of Classification Search
CPC ............. H04L 63/0428; H04L 63/0846; H04L 63/123; H04L 67/34
See application file for complete search history.

(56) References Cited

U.S. PATENT DOCUMENTS 1,951,798 A    3/1934 Lawson et al.
5,224,095 A    6/1993 Woest et al.
(Continued)

OTHER PUBLICATIONS

"Enterprise License Optimization," Flexera Software, Inc., copyright 2010, 1 page. Retrieved Jul. 28, 2010 from www.flexerasoftware.com.

(Continued)

*Primary Examiner* — Steven S Kim
*Assistant Examiner* — Terry Nathan Murray
(74) *Attorney, Agent, or Firm* — Yee & Associates, P.C.

(57) ABSTRACT

The different advantageous embodiments provide a system for managing license utilization comprising a client system, a number of message transport servers, and a number of license management servers. The client system is configured to generate a number of messages having information about usage associated with a project code or a business unit. The number of message transport servers replicates the number of messages. The number of messages is transmitted to a message transport server in the number of message transport servers. The message transport server receiving the number of messages replicates the number of messages to each message transport server. The number of license management servers has a number of license management services configured to listen for updates from the number of message transport servers. The updates are the number of messages replicated across the number of message transport servers.

20 Claims, 14 Drawing Sheets

(52) U.S. Cl.
CPC ......... *H04L 67/34* (2013.01); *G06Q 2220/18* (2013.01); *H04L 2463/101* (2013.01); *H04L 2463/102* (2013.01)

(56) References Cited

U.S. PATENT DOCUMENTS

| | | |
|---|---|---|
| 5,237,568 A | 8/1993 | Woest et al. |
| 5,243,595 A | 9/1993 | Woest et al. |
| 5,249,184 A | 9/1993 | Woest et al. |
| 5,553,143 A | 9/1996 | Ross et al. |
| 5,650,998 A | 7/1997 | Angenot et al. |
| 5,675,629 A | 10/1997 | Raffel et al. |
| 5,754,765 A | 5/1998 | Danneels et al. |
| 5,862,325 A | 1/1999 | Reed et al. |
| 5,911,120 A | 6/1999 | Jarett et al. |
| 5,911,143 A | 6/1999 | Deinhart et al. |
| 6,044,154 A | 3/2000 | Kelly |
| 6,091,706 A | 7/2000 | Shaffer et al. |
| 6,269,080 B1 | 7/2001 | Kumar |
| 6,336,201 B1 | 1/2002 | Geile et al. |
| 6,430,275 B1 | 8/2002 | Voit et al. |
| 6,438,468 B1 | 8/2002 | Muxlow et al. |
| 6,484,182 B1 | 11/2002 | Dunphy et al. |
| 6,526,056 B1 | 2/2003 | Rekhter et al. |
| 6,611,692 B2 | 8/2003 | Raffel et al. |
| 6,836,805 B1 | 12/2004 | Cook |
| 6,901,386 B1 | 5/2005 | Dedrick et al. |
| 6,961,858 B2 | 11/2005 | Fransdonk |
| 7,020,635 B2 | 3/2006 | Hamilton et al. |
| 7,080,049 B2 | 7/2006 | Truitt et al. |
| 7,090,128 B2 | 8/2006 | Farley et al. |
| 7,092,953 B1 | 8/2006 | Haynes |
| 7,107,462 B2 | 9/2006 | Fransdonk |
| 7,113,923 B1 | 9/2006 | Brichta et al. |
| 7,127,707 B1 | 10/2006 | Mishra et al. |
| 7,150,045 B2 | 12/2006 | Koelle et al. |
| 7,191,248 B2 | 3/2007 | Chattopadhyay et al. |
| 7,257,817 B2 | 8/2007 | Cabrera et al. |
| 7,360,079 B2 | 4/2008 | Wall |
| 7,428,004 B2 | 9/2008 | Creamer et al. |
| 7,519,736 B2 | 4/2009 | Parham |
| 7,552,429 B2 | 6/2009 | Dellinger et al. |
| 7,574,706 B2 | 8/2009 | Meulemans et al. |
| 7,587,502 B2 | 9/2009 | Crawford et al. |
| 7,617,328 B2 | 11/2009 | Lewis et al. |
| 7,676,436 B2 | 3/2010 | Harper |
| 7,694,294 B2 | 4/2010 | Bukovec et al. |
| 7,711,586 B2 | 5/2010 | Aggarwal et al. |
| 7,716,348 B1* | 5/2010 | Redding ............... G06F 21/105 709/229 |
| 7,793,334 B2 | 9/2010 | Lewis |
| 7,911,946 B2 | 3/2011 | Poli et al. |
| 7,974,726 B2 | 7/2011 | Rothe et al. |
| 8,065,741 B1 | 11/2011 | Coblentz et al. |
| 8,103,004 B2 | 1/2012 | Chavanne et al. |
| 8,223,965 B2 | 7/2012 | Bennett |
| 8,261,357 B2 | 9/2012 | Hilton |
| RE44,324 E * | 6/2013 | Briggs ..................... G07F 17/32 463/40 |
| 8,595,814 B2 | 11/2013 | Le et al. |
| 8,693,996 B2 | 4/2014 | Lewis et al. |
| 8,726,014 B2 | 5/2014 | Scovetta |
| 8,745,613 B2 | 6/2014 | Bambach et al. |
| 8,769,299 B1 | 7/2014 | Dickson |
| 8,925,110 B2 | 12/2014 | Li et al. |
| 9,152,771 B2 | 10/2015 | Hohlfeld et al. |
| 9,563,751 B1 | 2/2017 | Dickson |
| 10,754,525 B1* | 8/2020 | Al Majid ................ H04L 51/10 |
| 2002/0032874 A1 | 3/2002 | Hagen |
| 2002/0073334 A1 | 6/2002 | Sherman et al. |
| 2002/0083003 A1 | 6/2002 | Halliday et al. |
| 2002/0143987 A1* | 10/2002 | Sadler ................... H04L 63/0823 709/238 |
| 2002/0154631 A1 | 10/2002 | Makansi et al. |
| 2002/0169971 A1 | 11/2002 | Asano et al. |
| 2002/0184230 A1 | 12/2002 | Merrells et al. |
| 2002/0199001 A1 | 12/2002 | Wenocur et al. |
| 2003/0018510 A1 | 1/2003 | Sanches |
| 2003/0018808 A1 | 1/2003 | Brouk et al. |
| 2003/0072451 A1 | 4/2003 | Pimentel et al. |
| 2003/0101283 A1 | 5/2003 | Lewis et al. |
| 2003/0120936 A1 | 6/2003 | Farris et al. |
| 2003/0142364 A1 | 7/2003 | Goldstone |
| 2003/0159031 A1 | 8/2003 | Muller et al. |
| 2003/0172112 A1 | 9/2003 | Vignaud |
| 2003/0212942 A1 | 11/2003 | Nagaura et al. |
| 2003/0217010 A1 | 11/2003 | Stefik et al. |
| 2003/0217139 A1 | 11/2003 | Burbeck et al. |
| 2003/0217171 A1 | 11/2003 | Von Stuermer et al. |
| 2003/0220812 A1 | 11/2003 | Jones et al. |
| 2003/0233461 A1 | 12/2003 | Mariblanca-Nieves et al. |
| 2004/0049574 A1 | 3/2004 | Watson et al. |
| 2004/0068517 A1 | 4/2004 | Scott |
| 2004/0088183 A1 | 5/2004 | Nakanishi et al. |
| 2004/0138944 A1 | 7/2004 | Whitacre et al. |
| 2004/0255134 A1 | 12/2004 | Miyamoto |
| 2004/0260765 A1 | 12/2004 | Re et al. |
| 2005/0010758 A1 | 1/2005 | Landrock et al. |
| 2005/0021957 A1 | 1/2005 | Gu |
| 2005/0049973 A1 | 3/2005 | Read et al. |
| 2005/0086350 A1 | 4/2005 | Mai |
| 2005/0108579 A1 | 5/2005 | Issacson et al. |
| 2005/0120242 A1* | 6/2005 | Mayer ..................... G06F 21/56 726/4 |
| 2005/0122976 A1 | 6/2005 | Poli et al. |
| 2005/0149979 A1 | 7/2005 | Creamer et al. |
| 2005/0154889 A1 | 7/2005 | Ashley et al. |
| 2005/0176464 A1 | 8/2005 | Portasany Sanchez |
| 2005/0177823 A1 | 8/2005 | Miyake |
| 2005/0183143 A1 | 8/2005 | Anderholm et al. |
| 2005/0283388 A1 | 12/2005 | Eberwine et al. |
| 2006/0020712 A1 | 1/2006 | Wanek et al. |
| 2006/0045245 A1 | 3/2006 | Aaron et al. |
| 2006/0269063 A1 | 11/2006 | Hauge et al. |
| 2006/0287959 A1 | 12/2006 | Blecken |
| 2006/0287960 A1 | 12/2006 | Marsnik et al. |
| 2007/0168266 A1 | 7/2007 | Questembert |
| 2007/0168301 A1 | 7/2007 | Eisner et al. |
| 2007/0245148 A1 | 10/2007 | Buer |
| 2007/0283423 A1 | 12/2007 | Bradley et al. |
| 2007/0299845 A1 | 12/2007 | Tokunaga |
| 2008/0010371 A1 | 1/2008 | Yamamoto et al. |
| 2008/0071689 A1 | 3/2008 | Tabet |
| 2008/0098216 A1 | 4/2008 | Scovetta |
| 2008/0234046 A1* | 9/2008 | Kinsley ................... G07F 17/32 463/40 |
| 2008/0263224 A1 | 10/2008 | Gilhuly et al. |
| 2008/0288788 A1* | 11/2008 | Krig ....................... G06F 21/62 713/193 |
| 2008/0310376 A1* | 12/2008 | Ban ....................... H04W 40/20 370/338 |
| 2008/0313226 A1 | 12/2008 | Bowden et al. |
| 2009/0007220 A1 | 1/2009 | Ormazabal et al. |
| 2009/0132579 A1* | 5/2009 | Kwang ................... H04L 67/22 |
| 2009/0133059 A1* | 5/2009 | Gibbs ..................... G06F 16/48 725/34 |
| 2009/0165099 A1 | 6/2009 | Eldar et al. |
| 2009/0177698 A1* | 7/2009 | Chan ..................... G06F 21/105 |
| 2009/0183229 A1 | 7/2009 | Ohnishi |
| 2009/0279690 A1* | 11/2009 | Michaels ............... H04L 9/0662 380/28 |
| 2009/0292809 A1 | 11/2009 | Park et al. |
| 2010/0106705 A1 | 4/2010 | Rush et al. |
| 2010/0159887 A1 | 6/2010 | Lewis |
| 2011/0134836 A1 | 6/2011 | Lin et al. |
| 2011/0205949 A1 | 8/2011 | Maenpaa et al. |
| 2011/0213720 A1 | 9/2011 | Waid et al. |
| 2011/0296171 A1 | 12/2011 | Fu et al. |
| 2011/0296172 A1 | 12/2011 | Fu et al. |
| 2011/0296175 A1 | 12/2011 | Shin |
| 2011/0307958 A1 | 12/2011 | Ashton et al. |
| 2012/0011244 A1 | 1/2012 | Zhu |
| 2012/0255017 A1* | 10/2012 | Sallam ................ G06F 9/45558 726/24 |

(56) References Cited

U.S. PATENT DOCUMENTS

| | | |
|---|---|---|
| 2012/0297487 A1 | 11/2012 | Xia |
| 2013/0144742 A1 | 6/2013 | Thakur et al. |
| 2013/0198866 A1 | 8/2013 | Li et al. |
| 2015/0248560 A1 | 9/2015 | Pathak |
| 2018/0253261 A1* | 9/2018 | Kripalani ............... G06F 21/105 |
| 2020/0244754 A1* | 7/2020 | Au .......................... H04L 67/02 |

OTHER PUBLICATIONS

"Open It, Inc.," Open iT, Inc., undated, 2 pages. Retrieved Jul. 28, 2010 from www.openit.com.

Office Action, dated Nov. 21, 2012, regarding U.S. Appl. No. 12/903,580, 25 pages.

Office Action, dated Jun. 17, 2013, regarding U.S. Appl. No. 12/903,580, 14 pages.

Final Office Action, dated Dec. 4, 2013, regarding U.S. Appl. No. 12/903,580, 15 pages.

Notice of Allowance, dated Apr. 11, 2014, regarding U.S. Appl. No. 12/903,580, 9 pages.

Office Action, dated Feb. 10, 2012, regarding U.S. Appl. No. 12/903,612, 16 pages.

Office Action, dated Jul. 2, 2014, regarding U.S. Appl. No. 12/903,612, 29 pages.

Final Office Action, dated Nov. 20, 2014, regarding U.S. Appl. No. 12/903,612, 28 pages.

Office Action, dated Apr. 13, 2015, regarding U.S. Appl. No. 12/903,612, 28 pages.

Final Office Action, dated Oct. 8, 2015, regarding U.S. Appl. No. 12/903,612, 23 pages.

Office Action, dated Apr. 7, 2016, regarding U.S. Appl. No. 12/903,612, 27 pages.

Notice of Allowance, dated Sep. 26, 2016, regarding U.S. Appl. No. 12/903,612, 15 pages.

* cited by examiner

LICENSE UTILIZATION MANAGEMENT SYSTEM SERVICE SUITE

CROSS REFERENCE TO RELATED APPLICATIONS

This application is a divisional of U.S. patent application Ser. No. 12/903,612, filed Oct. 13, 2010, entitled "License Utilization Management System Service Suite", now U.S. Pat. No. 9,563,751, issued Feb. 7, 2017 and related to commonly assigned and U.S. patent application Ser. No. 12/903,580 filed Oct. 13, 2010, entitled "License Utilization Management System License Wrapper", now U.S. Pat. No. 8,769,299, issued Jul. 1, 2014, both of which are hereby incorporated by reference.

BACKGROUND INFORMATION

1. Field

The present disclosure relates generally to a management system for data processing systems and more particularly to a management system service suite for license utilization with data processing systems.

2. Background

Software applications typically require a user to possess a software license to use the given application. A software license is a contract governing the usage or redistribution of software. These software licenses are associated with an agreement of use that restricts the user to a certain type of use for the given application.

With proprietary software, a software license generally grants the holder to use one or more copies of the software application. The ownership of the software remains with the software publisher, and only use of the software according to the terms of the license is permitted by an end-user.

Software licenses can be costly, limiting the number of licenses for a particular type of software application that a given business or company may be able to afford. As such, software applications are often limited to a certain number of users or certain number of systems in keeping with the number of licenses purchased by the end-user from the software publisher.

Different business units or project groups may need to utilize software applications at different times and with varying degrees of use. Some units or groups may require less use of a given application than other units or groups. The groups or units who use the given application for a greater period of time should bear a greater portion of the cost for the license. However, most businesses do not have a way to track or manage this usage information.

Therefore, it would be advantageous to have a method and apparatus that addresses one or more of the issues discussed above.

SUMMARY

The different advantageous embodiments provide systems for managing license utilization comprising a client system, a number of message transport servers, and a number of license management servers. The client system is configured to generate a number of messages having information about license usage associated with a project code or a business unit. The number of message transport servers replicates the number of messages. The number of messages is transmitted to a message transport server in the number of message transport servers. The message transport server receiving the number of messages replicates the number of messages to each message transport server. The number of license management servers have a number of license management services configured to listen for updates from the number of message transport servers. The updates are the number of messages replicated across the number of message transport servers.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
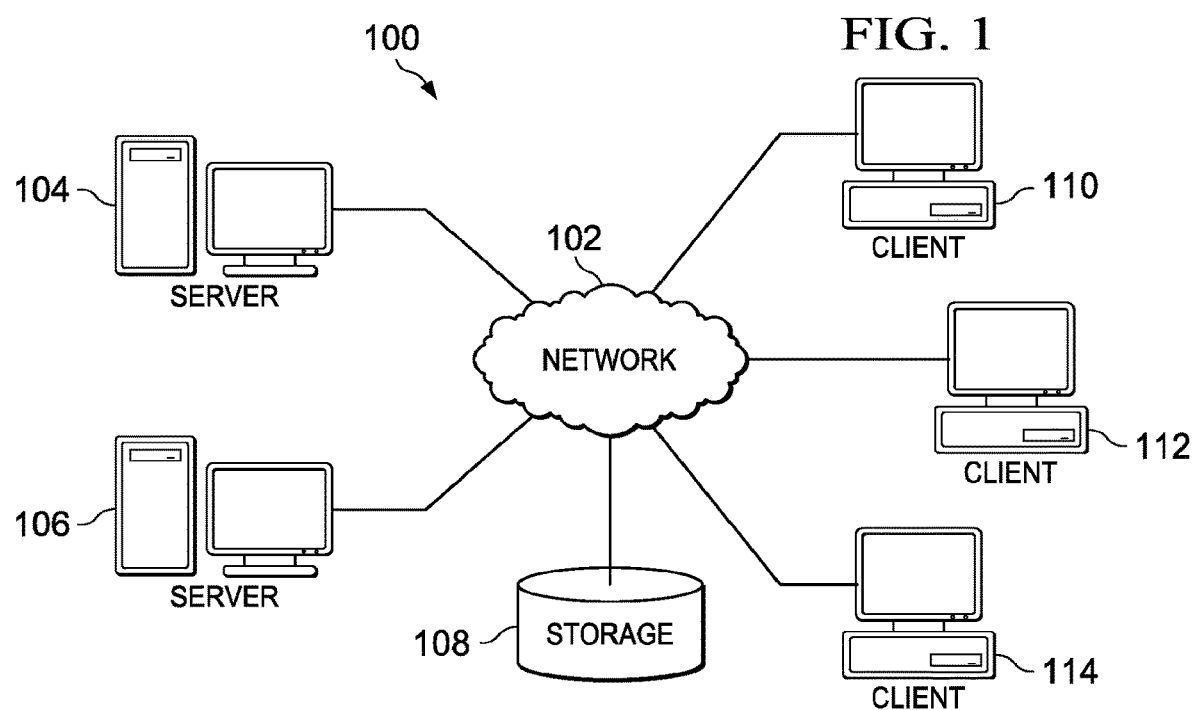
FIG. 1 is an illustration of a network of data processing systems in which an advantageous embodiment may be implemented.
Figure 2:
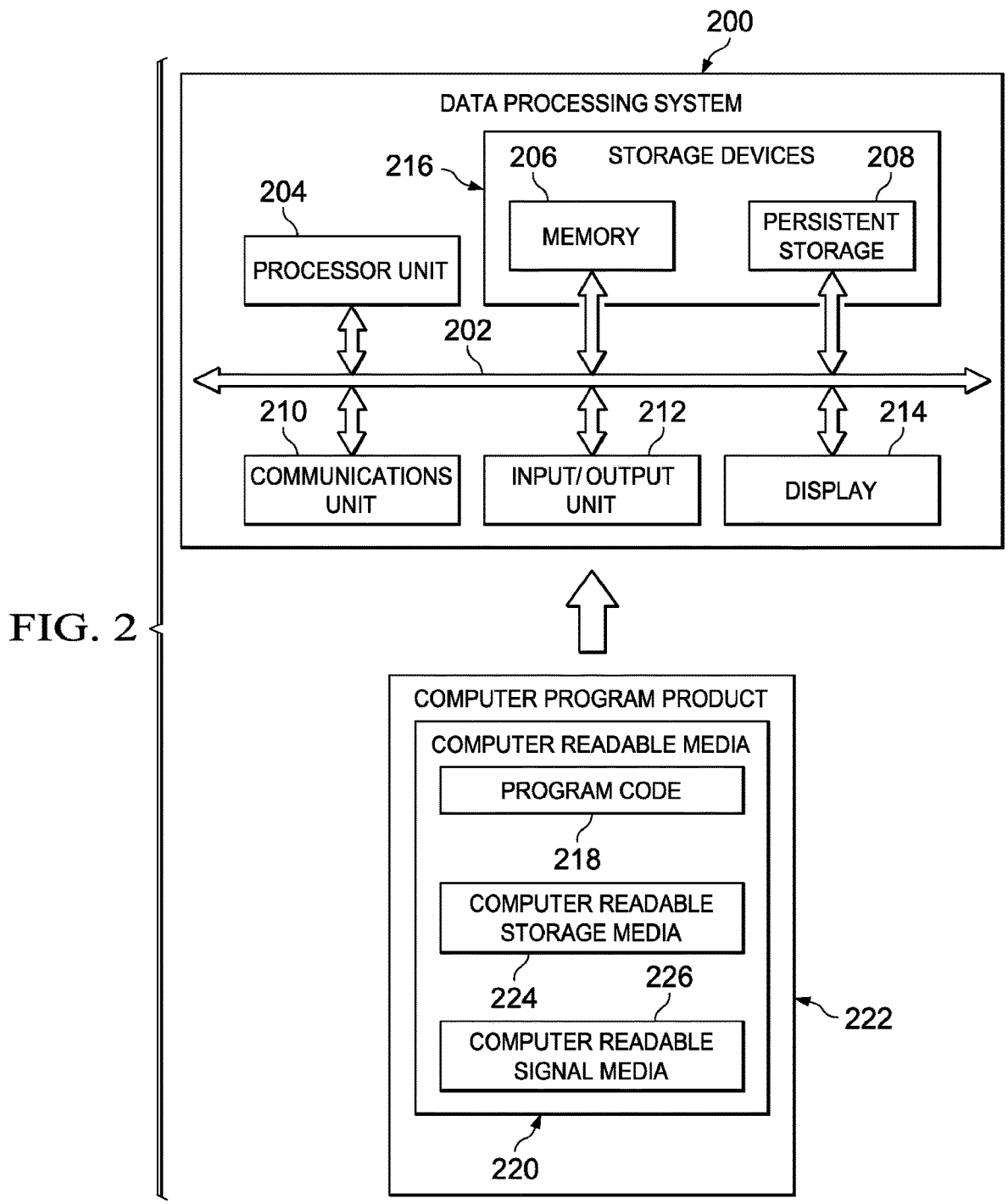
FIG. 2 is an illustration of a data processing system in accordance with an advantageous embodiment.

With reference now to the figures and in particular with reference to FIGS. 1-2, diagrams of data processing environments are provided in which the advantageous embodiments of the present invention may be implemented. It should be appreciated that FIGS. 1-2 are only illustrative and are not intended to assert or imply any limitation with regard to the environments in which different embodiments may be implemented. Many modifications to the depicted environments may be made.

With reference now to the figures and in particular with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environment may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

The different advantageous embodiments recognize and take into account that current software licenses are costly and often limit the number of licenses a company or business can afford to buy for a particular application. Additionally, the cost of the licenses is often inequitably spread across multiple business units that use the licenses with varying degrees of frequency. Current systems to track license usage are limited to specific platforms and specific types of licenses, and do not provide any way to track the usage particular to a business unit or project code for any type of license being used within a given company.

The different advantageous embodiments further recognize and take into account that a given license will have a license agreement stipulating the terms of use in one or more areas, such as the number of systems that can use the license at a given time, the number of users that can use the license at a given time, or the number of jobs that can run using the license at a given time. With varying agreements for each license, often a larger number of licenses than needed is purchased in order to cover the different user groups or systems that may need access to the license at different times.

Thus, the different advantageous embodiments provide a system for managing license utilization comprising a client system, a number of message transport servers, and a number of license management servers. The client system is configured to generate a number of messages having information about license usage associated with a project code or a business unit. The number of message transport servers replicates the number of messages. The number of messages is transmitted to a message transport server in the number of message transport servers. The message transport service receiving the number of messages replicates the number of messages to each message transport server. The number of license management servers have a number of license management services configured to listen for updates from the number of message transport servers. The updates are the number of messages replicated across the number of message transport servers.

The different advantageous embodiments further provide a method for updating message transport servers. A chargeback code argument is read. The chargeback code argument includes information about an update to a project code or a business code associated with a given license. A message password is generated. A message is generated using the information from the chargeback code argument and the message password to form an update message. A checksum is added to the update message. The update message is encrypted. The update message is transmitted to a number of message transport servers.

The different advantageous embodiments further provide a method for managing project code and business code usage. A message is received from a client system at a primary message transport server in a number of message transport servers. The message is decrypted. A checksum attached to the message is validated. A message format for the message is validated. Message content for the message is validated. A password associated with the message received is identified. A determination is made as to whether the password is authenticated. If the password is authenticated, the message is replicated to each message transport server in the number of message transport servers.

Figure 3:
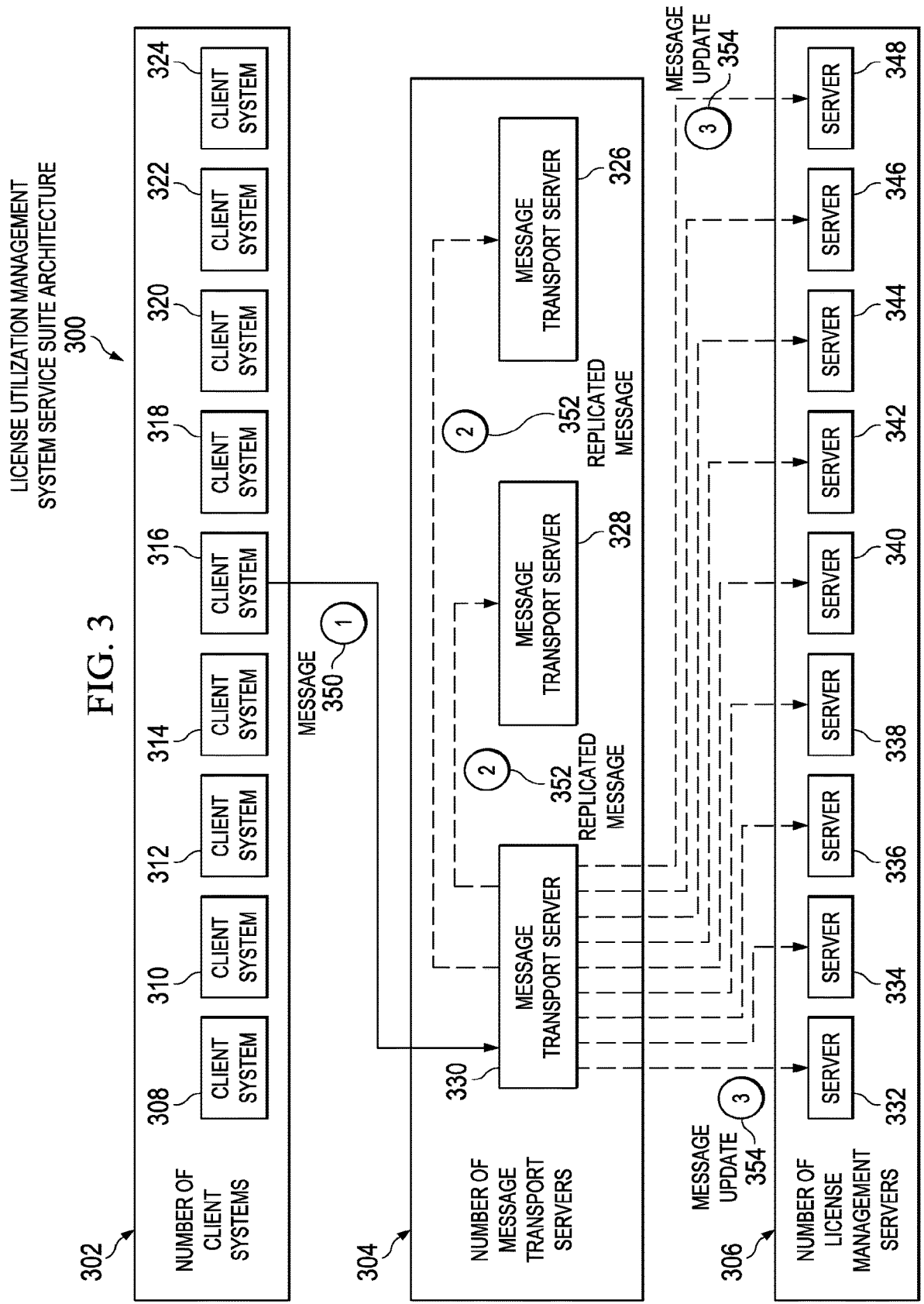
FIG. 3 is an illustration of a license utilization management system service suite architecture in accordance with an advantageous embodiment.

With reference now to FIG. 3, an illustration of a license utilization management system service suite architecture is depicted in accordance with an advantageous embodiment. The architecture in FIG. 3 may be implemented in a network environment, such as network data processing system 100 in FIG. 1, for example.

License utilization management system service suite architecture 300 includes number of client systems 302, number of message transport servers 304, and number of license management servers 306. Number of client systems 302 may be an illustrative example of one implementation of client 110, client 112, and/or client 114 in FIG. 1, for example. Number of client systems 302 may be implemented using data processing system 200 in FIG. 2, in one illustrative example. Number of client systems 302 may include any number of clients, or data processing systems, for example. In this illustrative example, number of client systems 302 includes client system 308, client system 310, client system 312, client system 314, client system 316, client system 318, client system 320, client system 322, and client system 324.

Number of message transport servers 304 may include any number of message transport servers. If number of message transport servers 304 includes two or more servers, additional fault tolerance and fault redundancy capabilities will be provided, for example. In an environment with two or more message transport servers, there may be a primary message transport server, a secondary message transport server, and so on for a given client system. In other words, each client system in number of client systems 302 may be configured to associate a specific message transport server as a primary server, a different message transport server as a secondary server, and so on, for example.

A configuration file on the client system identifies the primary message transport server, the secondary message transport server, and so on for the client system. The client system will attempt to contact the primary message transport server first, and if the attempt fails, move on to attempt contact with the secondary message transport server, and so on until contact is established or a failure is returned to the client system. When a connection is established with a message transport server, the client system sends the project code or business code to the message transport server. In this illustrative example, number of message transport servers 304 includes message transport server 326, message transport server 328, and message transport server 330.

Number of license management servers 306 is one or more servers that capture the business code and/or project code updates sent by number of client systems 302 through number of message transport servers 304 and correlates the code update information with a number of licenses that are in use, or checked out. This information collected and stored by number of license management servers 306 may be used to generate periodic license utilization reports, license denial reports, project code reports, and business code reports, for example. The information that the message transport servers pass to the license management servers is used to generate the project code and business code reports. Number of license management servers 306 includes server 332, server 334, server 336, server 338, server 340, server 342, server 344, server 346, and server 348.

In this illustrative example, message transport server 330 is the primary message transport server for client system 316. Message transport server 328 may be the secondary message transport server and message transport server 326 may be the tertiary message transport server for client system 316 in this example. Client system 316 attempts to establish contact with message transport server 330 first, as the primary message transport server to client system 316 in this illustrative example. If a connection is established with message transport server 330, message 350 is transmitted from client system 316 to message transport server 330.

In another illustrative example, where a connection is not established between client system 316 and message transport server 330, client system 316 may next attempt to establish contact with message transport server 328, as the secondary message transport server in this illustrative example. If a connection is established with message transport server 328, client system 316 transmits message 350 to message transport server 328. If a connection is not established, client system 316 may next attempt to establish a connection with message transport server 326 as the tertiary message transport server in this illustrative example. If no connection is established with message transport server 326, client system 316 will stop the attempt to send message 350.

Message transport server 330 receives message 350 from client system 316 and replicates message 350 to the other message transport servers in number of message transport servers 304, as illustrated by replicated message 352 sent from message transport server 330 to both message transport server 328 and message transport server 326. Message transport server 330 also transmits message 350 to each server in number of license management servers 306, as illustrated by message update 354. As a result, a query to any server within number of license management servers 306 will return the same data because each server has been updated with message update 354 from number of message transport servers 304.

The illustration of license utilization management system service suite architecture 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
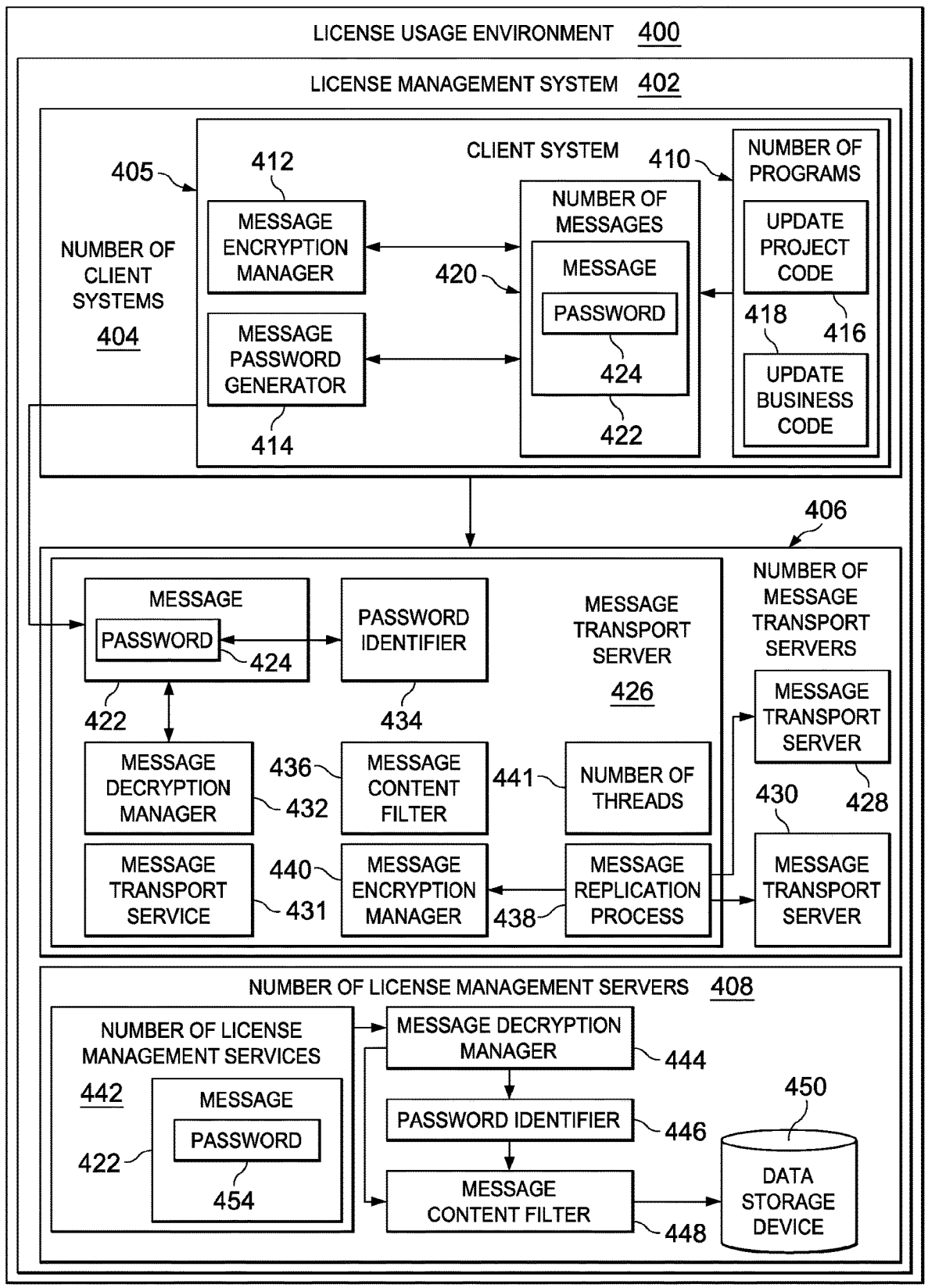
FIG. 4 is an illustration of a license usage environment in accordance with an advantageous embodiment.

With reference now to FIG. 4, an illustration of a license usage environment is depicted in accordance with an advantageous embodiment. License usage environment 400 may be implemented using a service suite architecture, such as license utilization management system service suite architecture 300 in FIG. 3, for example.

License usage environment 400 includes license management system 402. License management system 402 tracks license usage by project code and/or business code.

License management system 402 includes number of client systems 404, number of message transport servers 406, and number of license management servers 408. Client system 405 may be an illustrative example of one implementation of number of client systems 404, for example. Client system 405 may be implemented using data processing system 200 in FIG. 2, in one illustrative example.

Client system 405 includes number of programs 410, message encryption manager 412, and message password generator 414. Number of programs 410 is one or more client programs used to communicate project code and business code changes. Number of programs 410 may be invoked by users of client system 405 to communicate current projects and accounting business unit charges for work currently being conducted using a number of licenses. Work may be conducted using applications, or computer program products, that require licenses for utilization. These licenses may have usage limitations in accordance with a license agreement, for example. Number of programs 410 may include update project code 416 and update business code 418. Update project code 416 may be used to communicate the current project codes associated with work being conducted by client system 405. Update business code 418 may be used to communicate the current business unit associated with work being conducted by client system 405.

Number of programs 410 generates number of messages 420. Number of messages 420 may be a collection of information generated by number of programs 410 to communicate the project code and/or business unit updates. Number of messages 420 is associated with a password generated by message password generator 414 and encrypted using message encryption manager 412 before being transmitted to number of message transport servers 406 by client system 405. Message 422 is an illustrative example of one implementation of number of messages 420.

Message 422 is encrypted by message encryption manager 412. Message password generator 414 generates and associates password 424 with message 422. Password 424 is a unique, time-sensitive password that is used by number of message transport servers 406 to authenticate message 422.

Number of message transport servers 406 is located remote from number of client systems 404. Number of message transport servers 406 is an illustrative example of number of message transport servers 304 in FIG. 3. Message transport server 426 in this example is the message transport server with which client system 405 established a connection. Message transport server 426 may be the primary message transport server, or a secondary or tertiary server with which a connection was made after an attempt failed with the primary server, for example. Message transport server 428 message transport server 430 may be other servers in number of message transport servers 406.

Message transport server 426 is an illustrative example of one implementation of number of message transport servers 406. Message transport server 426 includes message transport service 431, message decryption manager 432, password identifier 434, message content filter 436, message replication process 438, message encryption manager 440, and number of threads 441. Each message transport server in number of message transport servers 406 may include similar components, for example.

Message transport service 431 is a software program that configures and runs message transport server 426 to receive messages from number of client systems 404 and process the messages accordingly. Message transport service 431 may configure number of threads 441 for message transport server 426, for example. Number of threads 441 may include, for example, without limitation, a message queue thread, a business code synchronization thread, a project code synchronization thread, a read client thread, a generate password thread, process message queue thread, message transport service thread, and/or any other suitable thread.

Message transport server 426 receives message 422 from client system 405. Message decryption manager 432 decrypts message 422. Message transport server 426 validates a checksum attached to the message. The message format and content of message 422 is also validated by message transport server 426. Password identifier 434 identifies password 424 associated with message 422 and validates password 424 to authenticate message 422. Password identifier 434 compares password 424 with a time sensitive password generator to determine if the message is a valid message. If password identifier 434 determines password 424 is invalid, message transport server 426 drops message 422. If password identifier 434 determines password 424 is valid, message transport server 426 replicates message 422 to message transport server 428, message transport server 430, and number of license management servers 408 using message replication process 438.

Message content filter 436 identifies the format and content of message 422. Message replication process 438 replicates message 422 to each message transport server in number of message transport servers 406. In this illustrative example, message replication process 438 replicates message 422 to message transport server 428 and message transport server 430. In this way, each server in number of message transport servers 406 is updated with the same information received in message 422.

Message replication process 438 builds a new message, or replicate of message 422, to transmit to each message transport server in number of message transport servers 406 and to number of license management servers 408. Message replication process 438 generates a new password, checksum, and message, and sends the message to message encryption manager 440 for encryption prior to transmitting the message to number of license management servers 408. Message encryption manager 440 encrypts replicated message 422 and sends encrypted message 422 to number of license management servers 408 for records update and storage.

Number of license management servers 408 includes number of license management services 442, message decryption manager 444, password identifier 446, message content filter 448, and data storage device 450. Number of license management services 442 listens for message updates from number of message transport servers 406. When a message is transmitted from the message transport servers, such as message 422, for example, number of license management services 442 receives message 422 from one of the number of message transport servers 406.

Message decryption manager 444 decrypts the encrypted message received by number of license management services 442. Password identifier 446 compares password 454 associated with message 422 with a time sensitive password generator to determine if the message is a valid message. Password 454 may be a time-sensitive password generated by message encryption manager 440 when re-building message 422 for transmission to number of license management servers 408, for example. If password identifier 446 determines password 454 is invalid, number of license management servers 408 drops message 422.

Message content filter 448 verifies that the content of message 422 is formatted in the correct manner and is valid. A message may be valid if sent by a valid triad server, for example. In an illustrative example, if the name of a triad server sending message 422 was incorrect, message 422 may be dropped. In some advantageous embodiments, an error message may be generated and sent to a log file within storage device 446, for example. The content of message 422 is the update information associated with the project code and/or business code, for example. Message content filter 448 stores verified information in data storage device 450. Data storage device 450 may be queried by license management software to determine project code and business unit usage trends and used to generate reports, for example.

The illustration of license usage environment 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
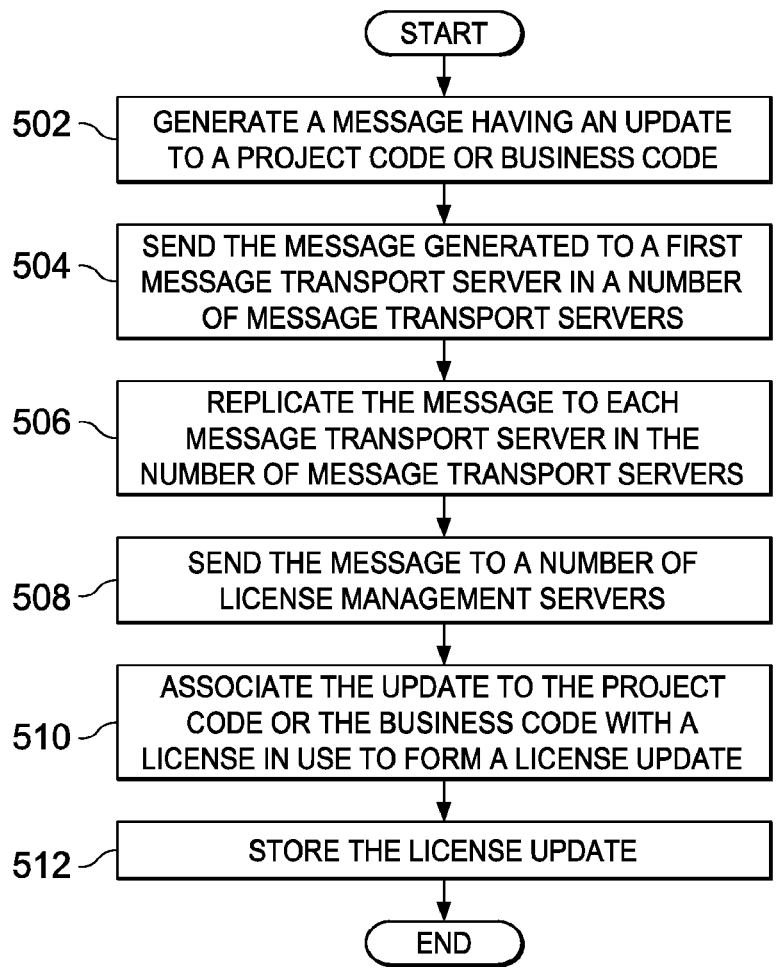
FIG. 5 is an illustration of a flowchart of a process for updating license usage by project code and business code in accordance with an advantageous embodiment.

With reference now to FIG. 5, an illustration of a flowchart of a process for updating license usage by project code and business code is depicted in accordance with an advantageous embodiment. The process in FIG. 5 may be implemented by a component such as license management system 402 in FIG. 4, for example.

The process begins by generating a message having an update to a project code or business code (operation 502). The message generation may be initiated by a user running a client program, such as number of programs 410 in FIG. 4, on a client system, such as client system 405, for example.

The process sends the message generated to a first message transport server in a number of message transport servers (operation 504). The first message transport server may be the primary message transport server associated with the client system sending the message, or the first message transport server with which the client system was able to establish a connection, for example.

The process replicates the message to each message transport server in the number of message transport servers (operation 506). The process then sends the message to a number of license management servers (operation 508). The process associates the update to the project code or the business code with a license in use to form a license update (operation 510. The process then stores the license update (operation 512), with the process terminating thereafter.

Figure 6:
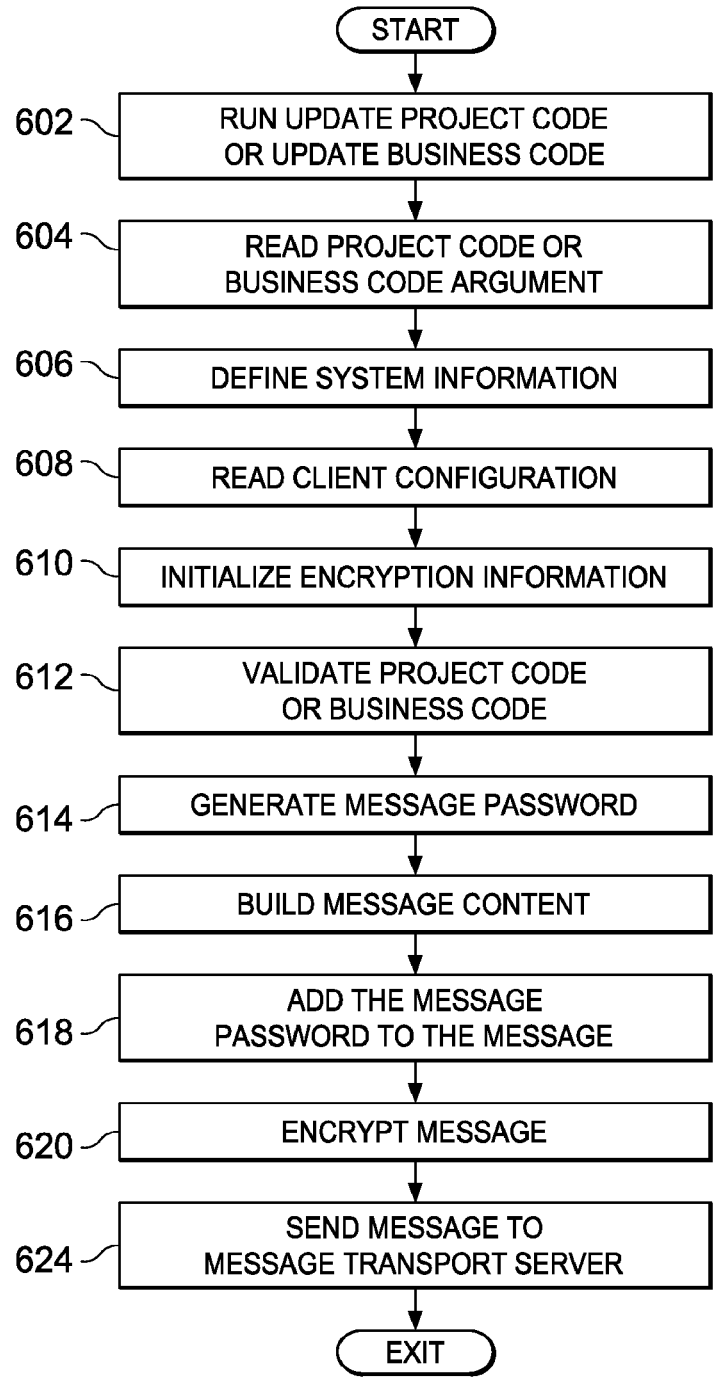
FIG. 6 is an illustration of a flowchart of a process for managing project code and business code usage in accordance with an advantageous embodiment.

With reference now to FIG. 6, an illustration of a flowchart of a process for managing project code and/or business code usage is depicted in accordance with an advantageous embodiment. The process in FIG. 6 may be implemented by a component such as license utilization management system 402 in FIG. 4, for example.

The process begins by running update project code or update business code (operation 602). The update project code and/or update business code may be a program initiated by a user of a client system, such as update project code 416 or update business code 418 in FIG. 4.

The process reads the project code or business code argument (operation 604). The argument may be information updating the project code or business unit associated with the current work of a user on a client system, for example. The process defines system information (operation 606). The system information is defined by obtaining the operating system name, the client name, the account name, and the configuration file name, for example.

The process then reads the client configuration (operation 608). The client configuration may include configuration files, encryption keys, service port numbers, and designation of transport message servers information, for example. The designation of transport message servers identifies the transport message server that is the primary, secondary, and so on for the client system.

The process initializes encryption information (operation 610) and validates the project code or business code (operation 612). Initializing encryption information includes setting up memory values that the encryption algorithm will use to encrypt a message in operation 620 before message transmission. Validating the code may include reading client project code files to determine if the project code or business code is valid. If the code is not valid, an error message may be generated. If the code is valid, the process continues and generates message password (operation 614).

The process builds message content (operation 616) and adds the message password to the message (operation 618). The process then encrypts the message (operation 620) and sends the message to a message transport server (operation 624), with the process terminating thereafter.

Sending the message to a message transport server involves establishing a connection to a message transport server in a number of message transport servers, such as number of message transport servers 406 in FIG. 4. If a connection is established with a primary message transport server, the message is transmitted and the process is complete. If a connection cannot be established with the primary message transport server, the process will attempt to connect to a secondary message transport server, and so on, until a connection is established and the message is transmitted, or until no connection can be established with any message transport server and the process terminates or an error message is generated.

Figure 7:
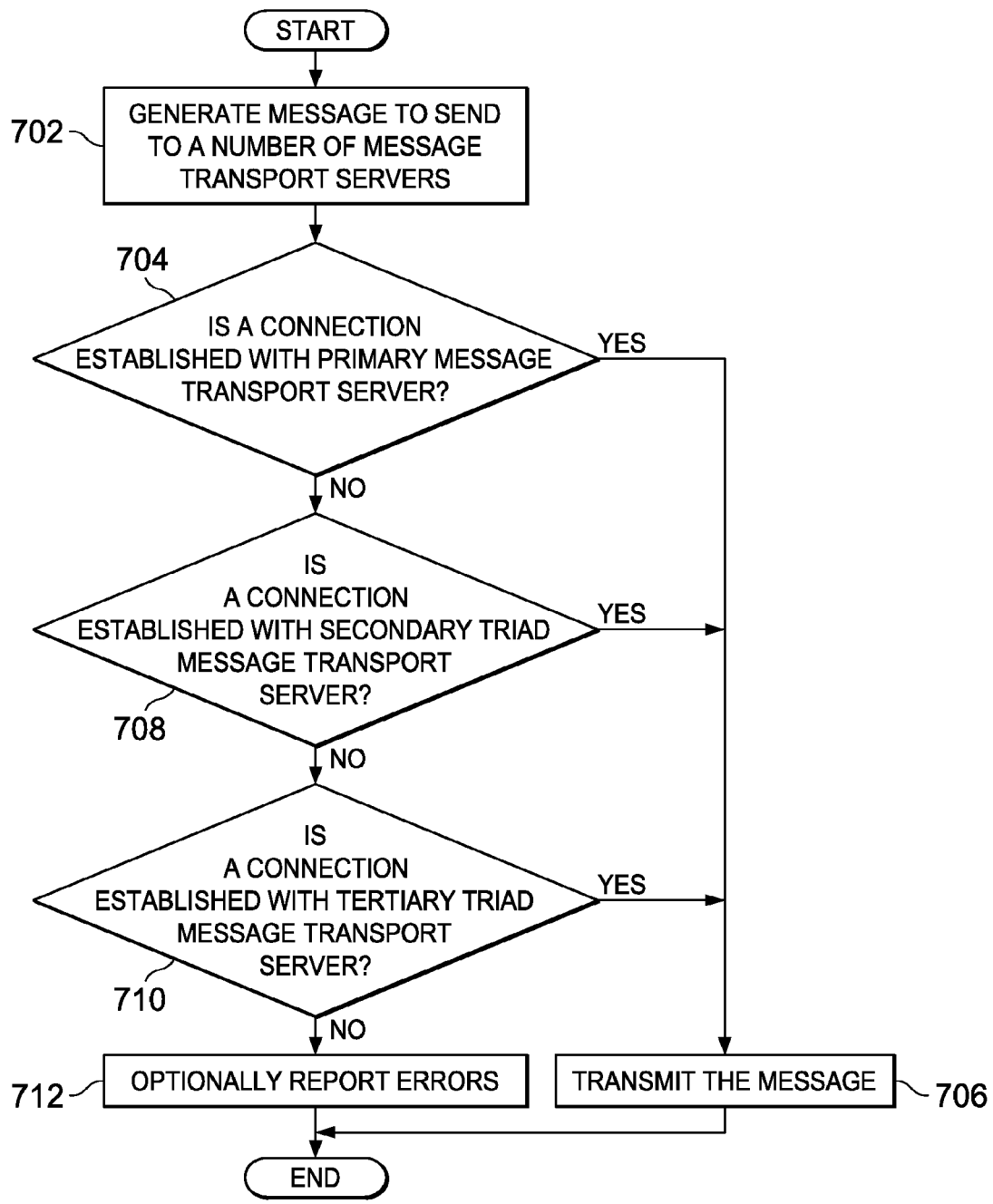
FIG. 7 is an illustration of a flowchart of a process for transmitting a message to a number of message transport servers in accordance with an advantageous embodiment.

With reference now to FIG. 7, an illustration of a flowchart of a process for transmitting a message to a number of message transport servers is depicted in accordance with an advantageous embodiment. The process in FIG. 7 may be implemented by a component such as client system 405 in FIG. 4, for example.

The process begins by generating a message to send to a number of message transport servers (operation 702). The message may be generated using the process described in FIG. 6, for example. The process determines whether a connection is established with a primary message transport server (operation 704). A primary message transport server may be a server defined as a primary message transport server in a configuration file of a client system, for example. The client system will attempt to establish a connection with message transport servers in sequential order as defined by the configuration file, starting with a primary message transport server.

If a determination is made that the connection is established with the primary message transport server, the process transmits the message (operation 706), and terminates thereafter. If a determination is made that the connection is not established with the primary message transport server, the process then determines whether a connection is established with a secondary message transport server (operation 708) as defined by the configuration file of the client system. If a determination is made that the connection is established with the secondary message transport server, the process transmits the message (operation 706), and terminates thereafter.

If a determination is made that the connection is not established, the process then determines whether a connection is established with a tertiary message transport server (operation 710). If a determination is made that the connection is established with the tertiary message transport server, the process transmits the message (operation 706), and terminates thereafter. If a determination is made that the connection is not established, the process optionally reports errors (operation 712) to an error log file, with the process terminating thereafter. Operation 712 is optional depending upon whether the error log file operation is active or inactive.

The process in FIG. 7 may attempt connections with any number of message transport servers. The flowchart example of FIG. 7 depicts a primary, secondary, and tertiary message transport server for illustrative purposes only.

Figure 8:
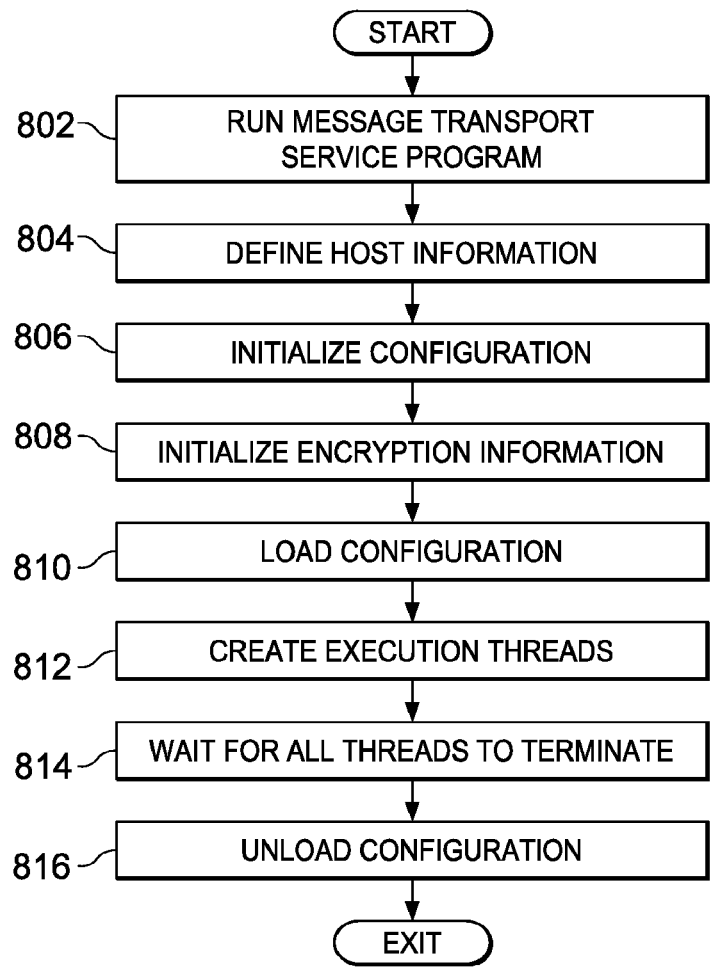
FIG. 8 is an illustration of a flowchart of a process for configuring a message transport server in accordance with an advantageous embodiment.

With reference now to FIG. 8, an illustration of a flowchart of a process for configuring a message transport server is depicted in accordance with an advantageous embodiment. The process in FIG. 8 may be implemented by a component such as message transport service 431 in FIG. 4, for example.

The process begins by running a message transport service program (operation 802). The message transport service program may be, for example, message transport service 431 in FIG. 4, for example. The process defines host information (operation 804). The host information may be information about the particular server being configured, for example.

The process initializes configuration (operation 806). Initializing configuration includes reading the message transport server configuration, reading the message transport server identification information, reading the message transport server service information, reading the server information for the message transport server, and reading the message transport server thread intervals.

The process initializes encryption information (operation 808). Initializing encryption information includes setting up a configuration, such as memory values or cypher identification values for example, that the encryption algorithm will use to encrypt a message before message transmission. The process then loads the configuration (operation 810) into the message transport service, such as message transport service 431 in FIG. 4. Loading the configuration may also include loading project codes, loading business codes, and loading a message queue, for example. A message queue may be generated by a first message transport server during a time period when a second message transport server is unavailable for receiving messages. The message queue collects messages that are not being transmitted due to the unavailability of the second message transport server. The messages in the message queue may then be transmitted when the first message transport server is able to connect with the second message transport server, for example.

The process creates execution threads (operation 812) and waits for all threads to terminate (operation 814). Waiting for all threads to terminate includes gathering thread status information and determining whether each thread in a number of threads being created has terminated. If a determination is made that all threads have not terminated, a time delay may occur as the process continues to gather thread status information. After all the threads have terminated, the process unloads the configuration (operation 816), with the process terminating thereafter.

Unloading the configuration includes unloading project codes, business codes, and the message queue from memory in the message transport server.

Figure 9:
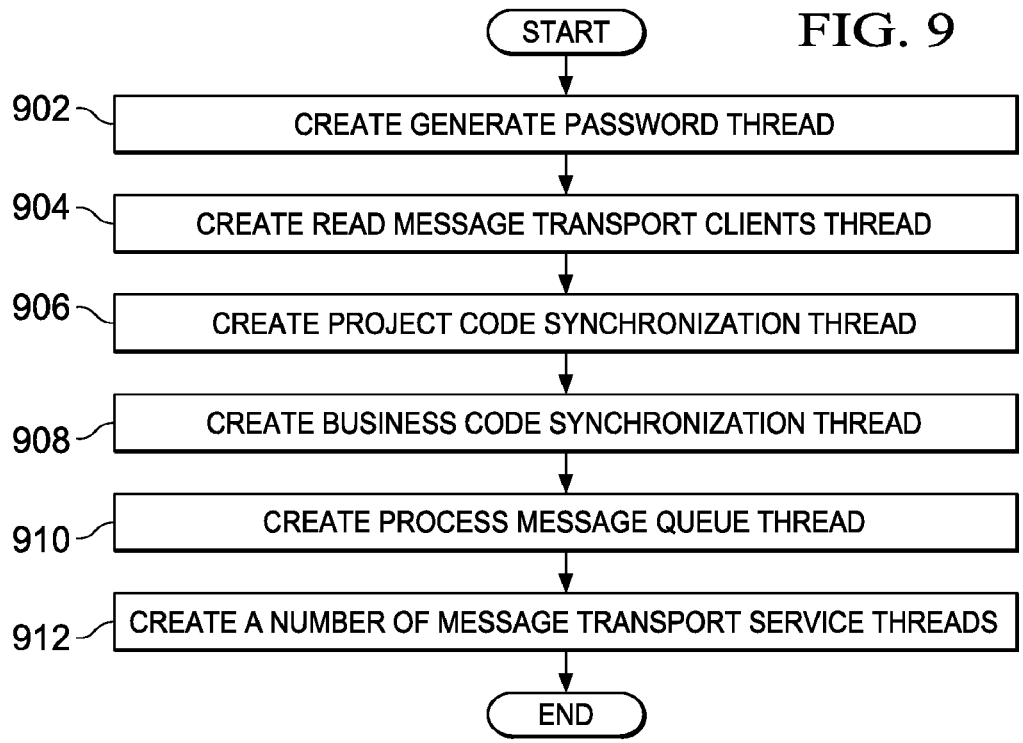
FIG. 9 is an illustration of a flowchart of a process for creating execution threads in a message transport server in accordance with an advantageous embodiment.

With reference now to FIG. 9, an illustration of a flowchart of a process for creating execution threads in a message transport server is depicted in accordance with an advantageous embodiment. The process in FIG. 9 may be implemented by a component such as message transport service 431 in FIG. 4, for example.

The process begins by creating a generate password thread (operation 902). The process creates a read message transport clients thread (operation 904). The process creates a project code synchronization thread (operation 906).

The process creates a business code synchronization thread (operation 908). The process creates a process message queue thread (operation 910). The process creates a number of message transport service threads (operation 912), with the process terminating thereafter.

The number of message transport service threads may provide operating efficiency for the transport message server, for example. In an illustrative example, the number of message transport service threads may be thirty-two service threads.

Figure 10:
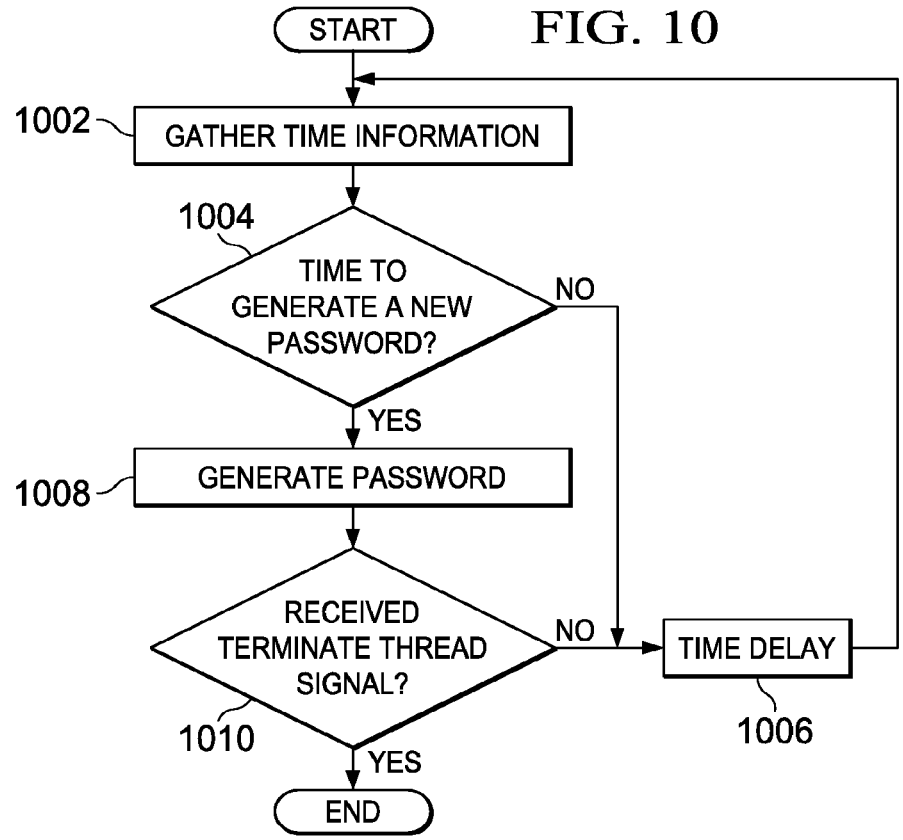
FIG. 10 is an illustration of a flowchart of a process for creating a generate password thread in a message transport server in accordance with an advantageous embodiment.

With reference now to FIG. 10, an illustration of a flowchart of a process for creating a generate password thread in a message transport server is depicted in accordance with an advantageous embodiment. The process in FIG. 10 may be implemented by a component such as message transport service 431 in FIG. 4, for example.

The process begins by gathering time information (operation 1002). The time information is the specific amount of time that has transpired since a predetermined date and time. In an illustrative example, time sensitive passwords are valid for a minimum of plus or minus five minutes. In this example, the thread checks every second to see if the amount of time which has elapsed since the last time sensitive password was generated is greater than five minutes. This ensures a fault tolerance to message transmission delays within the license management system. The process determines whether it is time to generate a new password (operation 1004).

If a determination is made that it is not time to generate a new password, the process enters a time delay (operation 1006) and returns to operation 1002. If a determination is made that it is time to generate a new password, the process generates a password (operation 1008). In an illustrative example, if it has been five minutes since the last time-sensitive password was generated, the process will determine it is time to generate a new password.

The process determines whether a terminate thread signal is received (operation 1010). If a determination is made that the terminate thread signal is not received, the process enters a time delay (operation 1006) and returns to operation 1002. If a determination is made that a terminate thread signal is received, the process terminates thereafter.

Figure 11:
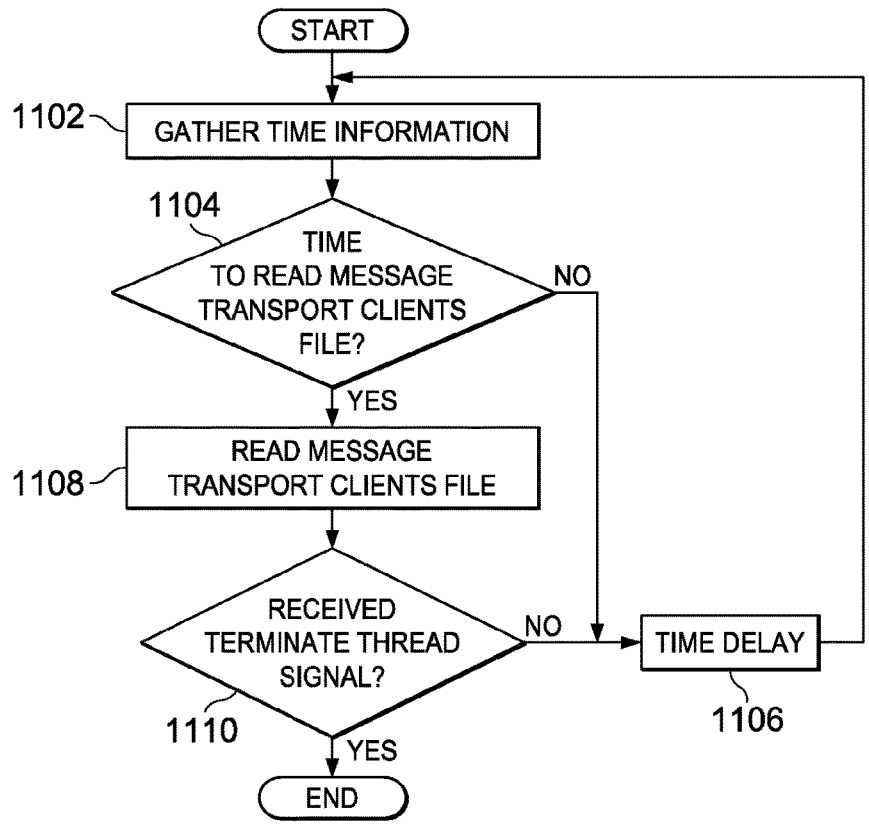
FIG. 11 is an illustration of a flowchart of a process for creating a read message transport clients thread in a message transport server in accordance with an advantageous embodiment.

With reference now to FIG. 11, an illustration of a flowchart of a process for creating a read message transport clients thread in a message transport server is depicted in accordance with an advantageous embodiment. The process in FIG. 11 may be implemented by a component such as message transport service 431 in FIG. 4, for example.

The process begins by gathering time information (operation 1102). The time information is the specific amount of time that has transpired since a predetermined date and time. The process determines whether it is time to read a message transport clients file (operation 1104). The message transport clients file is the list of clients, such as other message transport servers in number of message transport servers 304 and number of license management servers 306 in FIG. 3, to which the process will transmit messages.

If a determination is made that it is not time to read a message transport clients file, the process enters a time delay (operation 1106) and returns to operation 1102. If a determination is made that it is time to read a message transport clients file, the process reads the message transport clients file (operation 1108).

The process determines whether a terminate thread signal is received (operation 1110). If a determination is made that the terminate thread signal is not received, the process enters a time delay (operation 1106) and returns to operation 1102. If a determination is made that a terminate thread signal is received, the process terminates thereafter.

Figure 12:
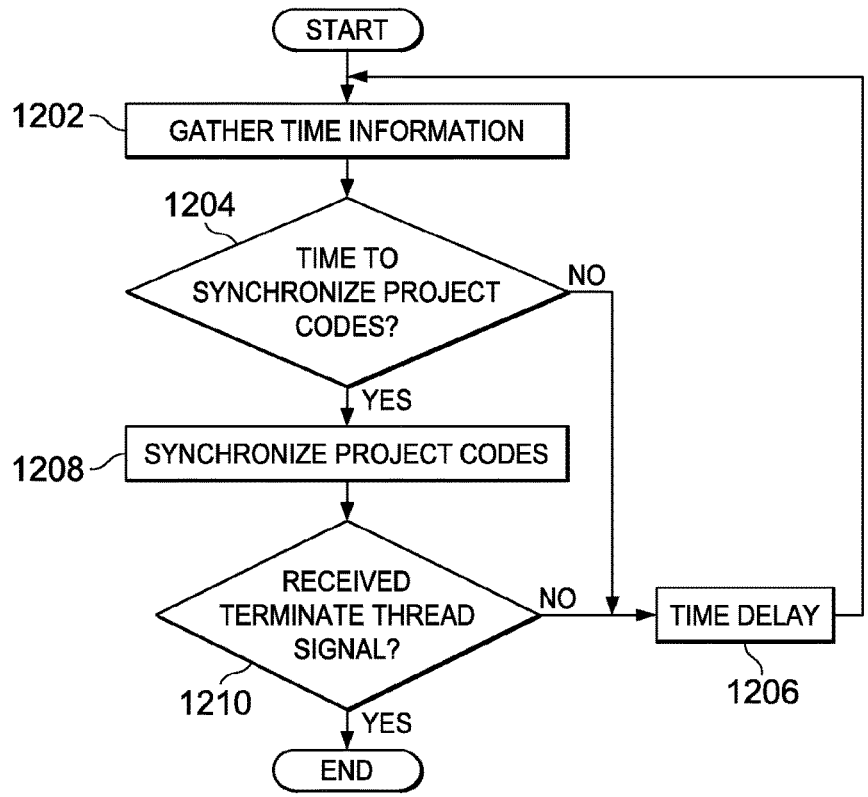
FIG. 12 is an illustration of a flowchart of a process for creating a project code synchronization thread in a message transport server in accordance with an advantageous embodiment.

With reference now to FIG. 12, an illustration of a flowchart of a process for creating a project code synchronization thread in a message transport server is depicted in accordance with an advantageous embodiment. The process in FIG. 12 may be implemented by a component such as message transport service 431 in FIG. 4, for example.

The process begins by gathering time information (operation 1202). The time information is the specific amount of time that has transpired since a predetermined date and time. The process determines whether it is time to synchronize project codes (operation 1204). The time value for the frequency of synchronization may be predetermined by a user, for example, during configuration of the system.

If a determination is made that it is not time to synchronize project codes, the process enters a time delay (operation 1206) and returns to operation 1202. If a determination is made that it is time to synchronize project codes, the process synchronizes the project codes (operation 1208).

The process determines whether a terminate thread signal is received (operation 1210). If a determination is made that the terminate thread signal is not received, the process enters a time delay (operation 1206) and returns to operation 1202. If a determination is made that a terminate thread signal is received, the process terminates thereafter.

Figure 13:
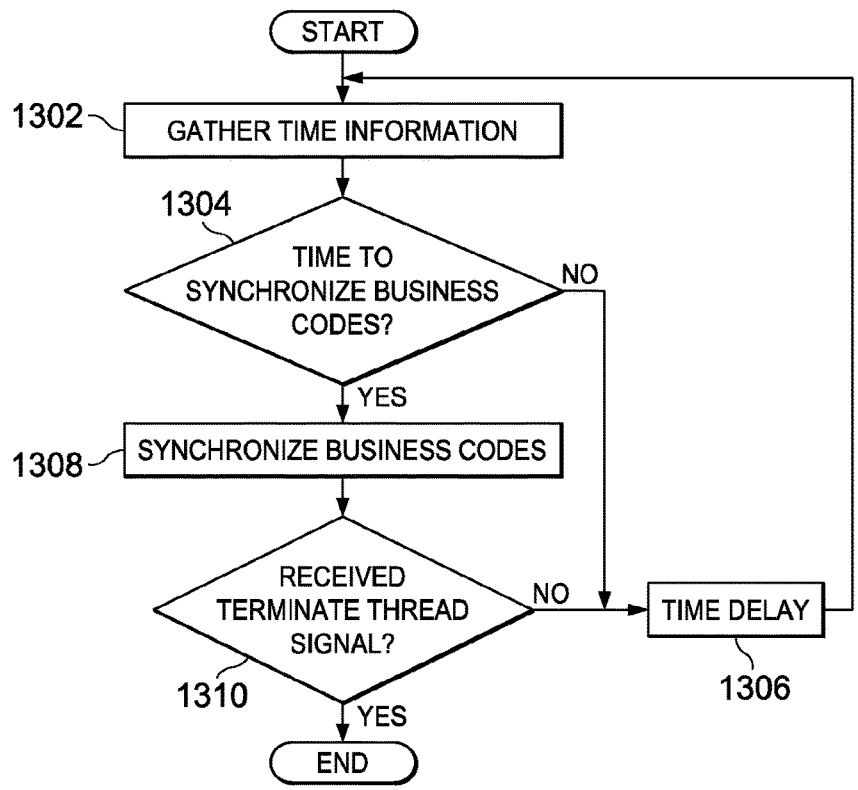
FIG. 13 is an illustration of a flowchart of a process for creating a business code synchronization thread in a message transport server in accordance with an advantageous embodiment.

With reference now to FIG. 13, an illustration of a flowchart of a process for creating a business code synchronization thread in a message transport server is depicted in accordance with an advantageous embodiment. The process in FIG. 13 may be implemented by a component such as message transport service 431 in FIG. 4, for example.

The process begins by gathering time information (operation 1302). The time information is the specific amount of time that has transpired since a predetermined date and time. The process determines whether it is time to synchronize business codes (operation 1304). The time value for the frequency of synchronization may be predetermined by a user, for example, during configuration of the system.

If a determination is made that it is not time to synchronize business codes, the process enters a time delay (operation 1306) and returns to operation 1302. If a determination is made that it is time to synchronize business codes, the process synchronizes the business codes (operation 1308).

The process determines whether a terminate thread signal is received (operation 1310). If a determination is made that the terminate thread signal is not received, the process enters a time delay (operation 1306) and returns to operation 1302. If a determination is made that a terminate thread signal is received, the process terminates thereafter.

Figure 14:
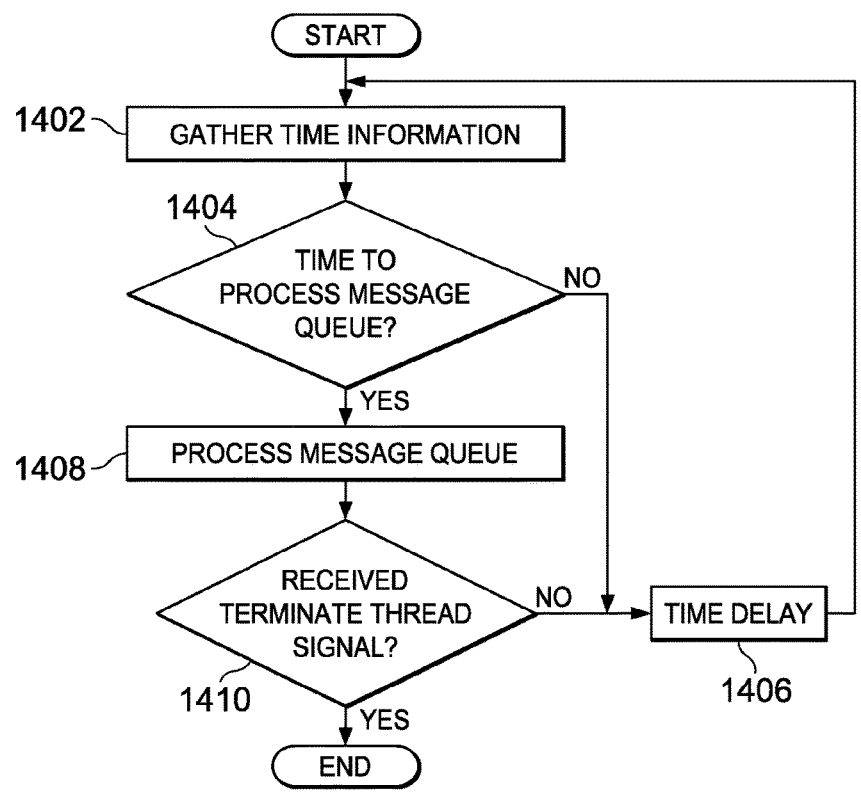
FIG. 14 is an illustration of a flowchart of a process for creating a process message queue thread in a message transport server in accordance with an advantageous embodiment.

With reference now to FIG. 14, an illustration of a flowchart of a process for creating a process message queue thread in a message transport server is depicted in accordance with an advantageous embodiment. The process in FIG. 14 may be implemented by a component such as message transport service 431 in FIG. 4, for example.

The process begins by gathering time information (operation 1402). The time information is the specific amount of time that has transpired since a predetermined date and time. The process determines whether it is time to process a message queue (operation 1404).

If a determination is made that it is not time to process the message queue, the process enters a time delay (operation 1406) and returns to operation 1402. If a determination is made that it is time to process the message queue, the process then processes the message queue (operation 1408). Processing the message queue includes reading off the content of messages that are waiting to be sent to other message transport services, and attempting to send the messages sequentially. Any message that cannot be sent are returned to the queue and wait for the message queue to be processed again.

The process determines whether a terminate thread signal is received (operation 1410). If a determination is made that the terminate thread signal is not received, the process enters a time delay (operation 1406) and returns to operation 1402. If a determination is made that a terminate thread signal is received, the process terminates thereafter.

Figure 15:
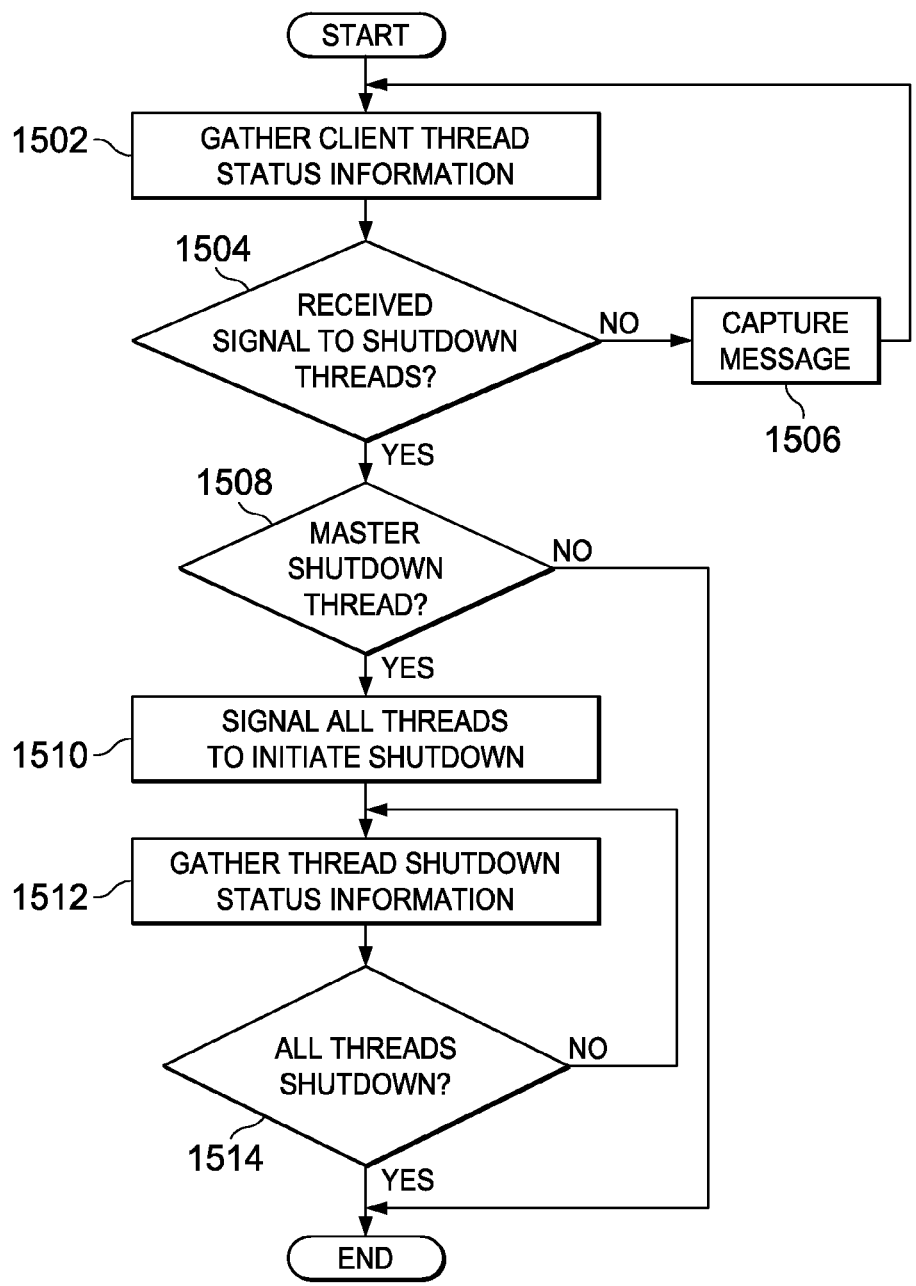
FIG. 15 is an illustration of a flowchart of a process for creating a message transport service thread in a message transport server in accordance with an advantageous embodiment.

With reference now to FIG. 15, an illustration of a flowchart of a process for creating a message transport service thread in a message transport server is depicted in accordance with an advantageous embodiment. The process in FIG. 15 may be implemented by a component such as message transport service 431 in FIG. 4, for example.

The process begins by gathering client thread status information (operation 1502). The process determines whether a signal to shut down threads is received (operation 1504).

If a determination is made that the signal to shut down threads is not received, the process captures a message (operation 1506) and returns to operation 1502. If a signal is not received to shutdown the message transport server, the message transport service waits to receive a message, or capture the next available message, for example. If no messages currently exist, the process waits for a message to capture. If a determination is made that the signal to shut down threads is received, the process then determines whether a master shutdown thread is received (operation 1508). When a thread receives a shutdown message, that thread becomes the master shutdown thread. The master shutdown thread takes responsibility to shut down all other running threads, in essence making the other threads the children threads. This is to ensure that only the first thread receiving the shutdown signal attempts to shut down the service, and each thread is not trying to shut down one other.

If a determination is made that the master shutdown thread is not received, the process terminates. If a determination is made that the master shutdown thread is received, the process signals all threads to initiate shutdown (operation 1510). The process then gathers thread shutdown status information (operation 1512).

The process determines whether all threads have shut down (operation 1514). If a determination is made that all threads have not shut down, the process returns to operation 1512. If a determination is made that all threads have shut down, the process terminates thereafter.

Figure 16:
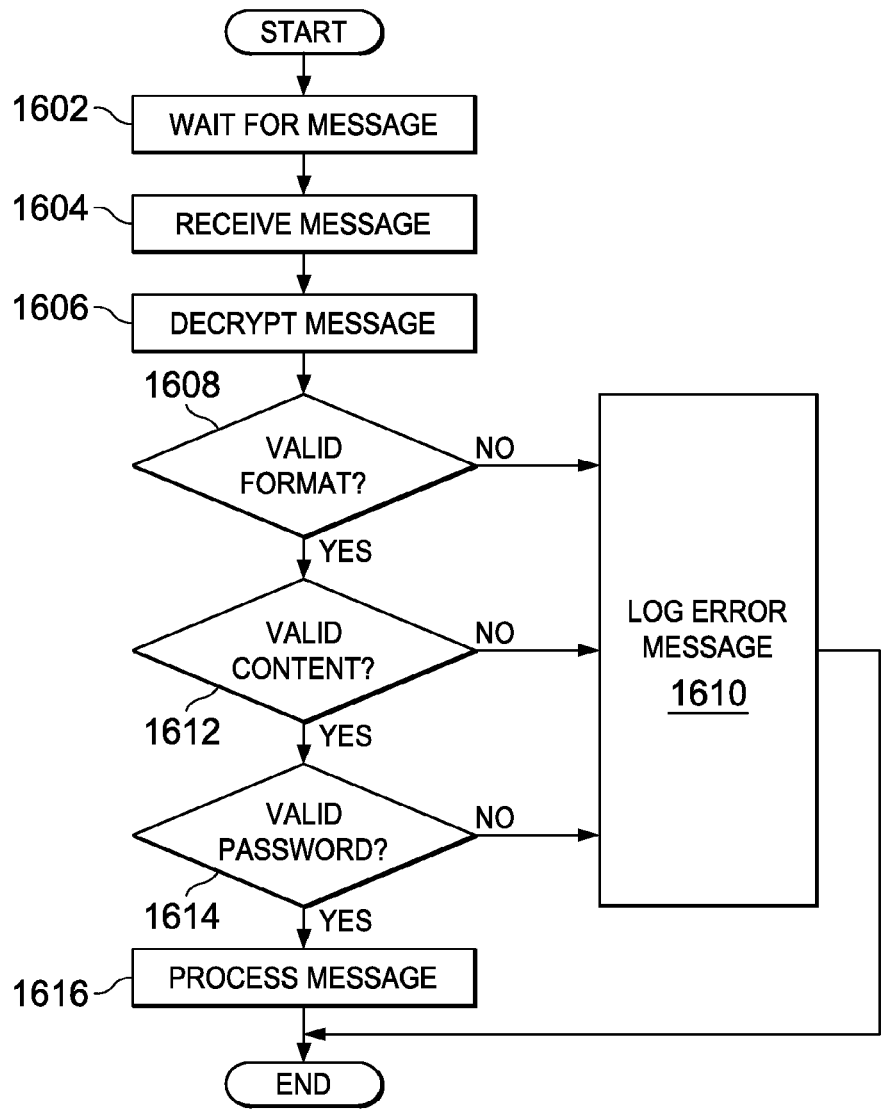
FIG. 16 is an illustration of a flowchart of a process for capturing a message in a message transport server in accordance with an advantageous embodiment.

With reference now to FIG. 16, an illustration of a flowchart of a process for capturing a message in a message transport server is depicted in accordance with an advantageous embodiment. The process in FIG. 16 may be implemented by a component such as message transport server 426 in FIG. 4, for example.

The process begins by waiting for a message (operation 1602). The message may be generated by a client system, such as client system 405 in FIG. 4, for example. The process receives the message (operation 1604). The process decrypts the message (operation 1606).

The process then determines whether the message has a valid format (operation 1608). If a determination is made that the message does not have a valid format, the process logs an error message (operation 1610), and terminates.

If a determination is made that the message has a valid format, the process then determines whether the message has valid content (operation 1612). If a determination is made that the message does not have valid content, the process logs an error message (operation 1610), and terminates.

If a determination is made that the message has valid content, the process then determines whether the message has a valid password (operation 1614). If a determination is made that the message does not have a valid password, the process logs an error message (operation 1610), and terminates.

If a determination is made that the message has a valid password, the process then processes the message (operation 1616), with the process terminating thereafter.

Processing the message may include replicating the message to other message transport servers and sending the message to a number of license management servers as well, as described with more detail in FIG. 17 below.

Figure 17:
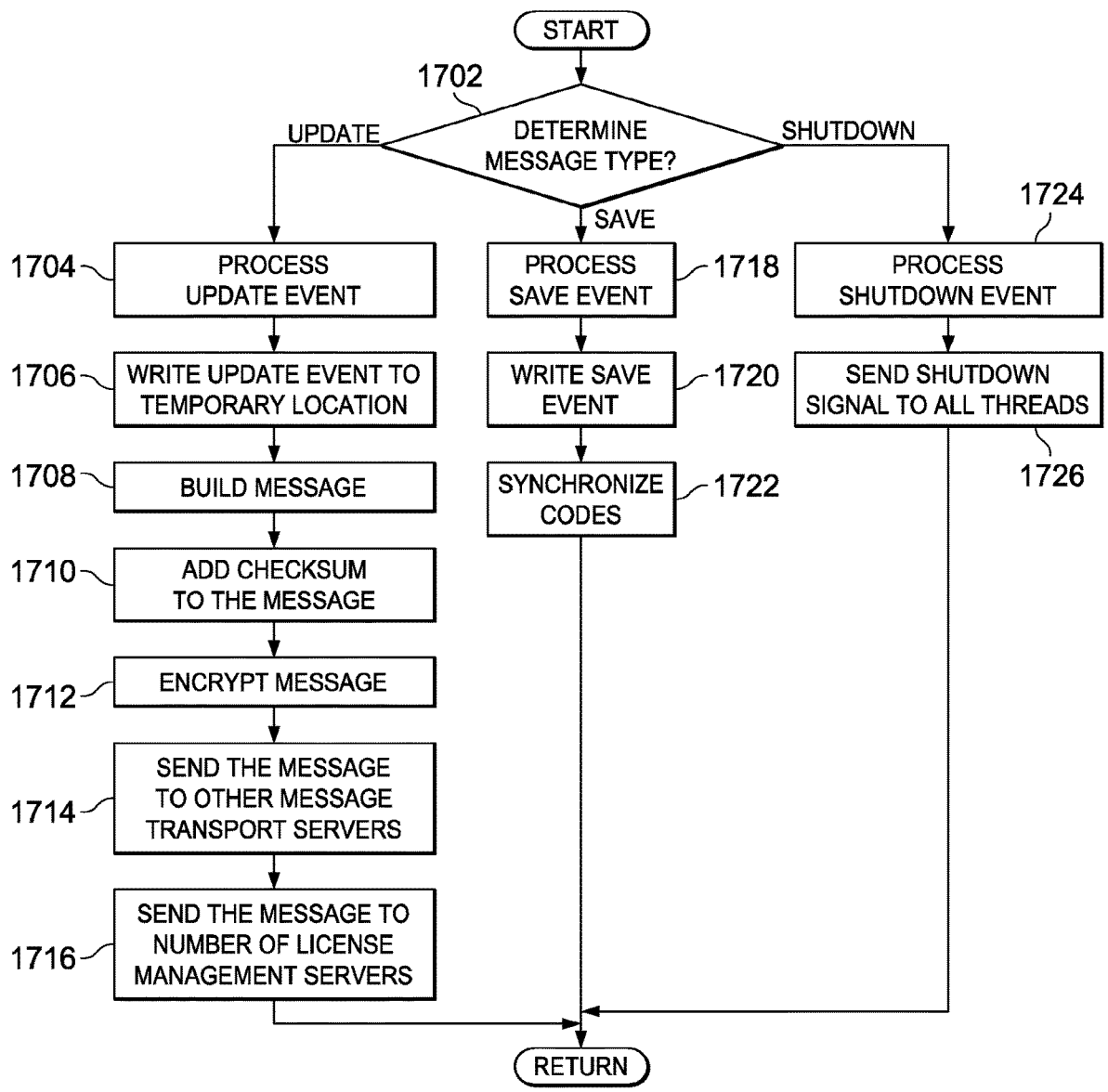
FIG. 17 is an illustration of a flowchart of a process for processing a message in a message transport server in accordance with an advantageous embodiment.

With reference now to FIG. 17, an illustration of a flowchart of a process for processing a message in a message transport server is depicted in accordance with an advantageous embodiment. The process in FIG. 17 may be implemented by a component such as message transport server 426 in FIG. 4, for example.

The process begins by determining a message type (operation 1702). If the process determines the message type is an update, the process then processes the update event (operation 1704). The process writes the update event to a temporary location (operation 1706). The temporary location may be local storage on the message transport server, for example.

The process then builds the message (operation 1708). The message received may have included an original time-sensitive password. This password may expire during processing of the message, or be too short-lived to prosper during a subsequent transfer of the message to a license management server. As such, the process may associate a new time-sensitive password with the message during the message build prior to sending the message to the number of license management servers.

The process adds a checksum to the message (operation 1710) and encrypts the message (operation 1712). The message encryption may utilize an encryption manager, such as message encryption manager 440 in FIG. 4, for example.

The process sends the message to other message transport servers (operation 1714) in a number of message transport servers. The process then sends the message to a number of license management servers (operation 1716), with the process terminating thereafter.

If the process determines in operation 1702 that the message type is a save message, the process then process the save event (operation 1718) and writes the save event (operation 1720). Writing the save event may include transferring the content in memory to an external memory device, such as flash memory for example. The process then synchronizes codes (operation 1722), with the process terminating thereafter.

If the process determines in operation 1702 that the message type is a shutdown message, the process then processes a shutdown event (operation 1724) and sends a shutdown signal to all threads (operation 1726), with the process terminating thereafter. This provides a method to shutdown the process before a server is shut down, for example.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current software licenses are costly and often limit the number of licenses a company or business can afford to buy for a particular application. Additionally, the cost of the licenses is often inequitably spread across multiple business units that use the licenses with varying degrees of frequency. Current systems to track license usage are limited to specific platforms and specific types of licenses, and do not provide any way to track the usage particular to a business unit or project code for any type of license being used within a given company.

The different advantageous embodiments further recognize and take into account that a given license will have a license agreement stipulating the terms of use in one or more areas, such as the number of systems that can use the license at a given time, the number of users that can use the license at a given time, or the number of jobs that can run using the license at a given time. With varying agreements for each license, often a larger number of licenses than needed is purchased in order to cover the different user groups or systems that may need access to the license at different times.

Therefore, the different advantageous embodiments provide a system and method that communicate project code and business unit changes associated with license usage, track usage by project code and/or business unit, and can equitably distribute the cost of licenses based on usage. The different advantageous embodiments further provide a system and method that distributes node based, user based, and honor based licenses in a concurrent methodology that allows for more efficient use of a fewer number of licenses.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for updating message transport servers, the method comprising:

collecting license usage information generated by a number of programs associated with a client system, wherein the license usage information includes information about an update to at least one of a project code or a business unit associated with a given license;

generating, by the client system a message password;

generating, by the client system, an update message using the license usage information and the message password;

adding, by the client system, a checksum to the update message;

generating, by the client system, an encrypted update message by encrypting the update message;

determining, by the client system, whether a connection with a primary message transport server of a number of message transport servers can be established;

in response to determining that the connection can be established with the primary message transport server:
  transmitting, by the client system, the encrypted update message to the primary message transport server;
  replicating, by the primary message transport server, the encrypted update message to other message transport servers of the number of message transport servers;
  transmitting, by the primary message transport server, the encrypted update message to each of a plurality of license management servers; and
  updating each license management server with the encrypted update message from the primary message transport server such that a query to any license management server within the plurality of license management servers will return identical information about license usage;

in response to determining that the connection with the primary message transport server cannot be established and in response to determining that a connection with a secondary message transport server of the number of message transport servers can be established:
  transmitting, by the client system, the encrypted update message to the secondary message transport server;
  replicating, by the secondary message transport server, the encrypted update message to other message transport servers of the number of message transport servers;
  transmitting, by the secondary message transport server, the encrypted update message to each of a plurality of license management servers; and
  updating each license management server with the encrypted update message from the secondary message transport server such that a query to any license management server within the plurality of license management servers will return identical information about license usage;

in response to determining that the connection with the primary message transport server and the connection with the secondary message transport server cannot be established and in response to determining that a connection with a tertiary message transport server of the number of message transport servers can be established:
transmitting, by the client system, the encrypted update message to the tertiary message transport server;
replicating, by the tertiary message transport server, the encrypted update message to other message transport servers of the number of message transport servers;
transmitting, by the tertiary message transport server, the encrypted update message to each of a plurality of license management servers; and
updating each license management server with the encrypted update message from the tertiary message transport server such that a query to any license management server within the plurality of license management servers will return identical information about license usage.

2. The method of claim 1, wherein generating the update message further comprises:
defining operating specific parameters; and
reading client configuration, service, and servers.

3. The method of claim 1, wherein the update message is encrypted using a message encryption manager.

4. The method of claim 1, wherein the message password is generated and associated with the update message using a message password generator.

5. The method of claim 1, wherein the message password is a time sensitive password.

6. The method of claim 1, further comprising:
determining whether a connection is established with the tertiary message transport server; and
responsive to a determination that the connection is not established, reporting errors.

7. The method of claim 1 wherein each license management server of the plurality of license management servers correlates the license usage information from the update message with a number of licenses.

8. The method of claim 7, further comprising:
operating the client system based on the license usage information including the project code and the business unit such that a software license is available to the client system based on the project code and the business unit, wherein a work product is created using computer program products requiring the software license for utilization based on the project code and the business unit; and
associating a cost of operating the client system with the software license with one or more of the project code or the business unit based on the update message.

9. The method of claim 1, wherein information returned by the query is used to generate periodic reports comprising license utilization, license denial, project code usage, or business unit usage.

10. A license management system, the system comprising:
a client system comprising at least one processor;
a plurality of message transport servers comprising a primary message transport server, a secondary message transport server, and a tertiary message transport server, wherein each of the message transport servers comprises at least one processor; and
a plurality of license management servers, wherein each of the plurality of license management servers comprises at least one processor;
wherein the processor of the client system is programmed to:
collect license usage information generated by a number of programs associated with the client system, wherein the license usage information includes information about an update to at least one of a project code or a business unit associated with a given license;
generate a message password;
generate an update message using the license usage information and the message password;
add a checksum to the update message;
generate an encrypted update message by encrypting the update message;
in response to determining that a connection can be established with the primary message transport server, transmit the encrypted update message to the primary message transport server;
in response to determining that the connection cannot be established with the primary message transport server and in response to determining that a connection can be established with the secondary message transport server, transmit the encrypted update message to the secondary message transport server;
in response to determining that the connection with the primary message transport server and with the secondary message transport server cannot be established and in response to determining that a connection with a tertiary message transport server can be established, transmit the encrypted update message to the tertiary message transport server;
wherein the at least one processor of the primary message transport server is programmed to:
replicate the encrypted update message to each of the plurality of message transport servers; and
transmit the encrypted update message to each of the plurality of license management servers;
wherein the at least one processor of the secondary message transport server is programmed to:
replicate the encrypted update message to each of the plurality of message transport servers; and
transmit the encrypted update message to each of the plurality of license management servers;
wherein the at least one processor of the tertiary message transport server is programmed to:
replicate the encrypted update message to each of the plurality of message transport servers; and
transmit the encrypted update message to each of the plurality of license management servers;
wherein the plurality of license management servers is programmed to:
update each of the plurality of license management server with the encrypted update message from one of the plurality of message transport servers such that a query to any license management server within the plurality of license management servers will return identical information about license usage.

11. The license management system of claim 10, wherein the client system further comprises a message encryption manager when executed by the client system is programmed to encrypt the update message.

12. The license management system of claim 10, wherein the client system further comprises a message password generator when executed by the client system is programmed to generate and associate a respective message password with each update message generated by the client system.

13. The license management system of claim 12, wherein each respective password is a unique, time-sensitive password.

14. The license management system of claim 10, wherein the plurality of message transport servers further comprise:
   a password identifier configured to identify the message password associated with the update message and authenticate the message password; and
   a message decryption manager when executed by the client system is programmed to decrypt the update message received from the client system.

15. The license management system of claim 10, wherein a software license is available to the client system based on the project code and the business unit.

16. The license management system of claim 15, wherein the plurality of license management servers associate a cost of operating the client system with the software license.

17. The license management system of claim 10, wherein the plurality of license management servers are configured to listen for updates from the plurality of message transport servers, wherein the updates are the update messages replicated across the plurality of message transport servers.

18. The license management system of claim 10, wherein in response to determining that the connection with the primary message transport server, the secondary transport server, and the tertiary message transport server cannot be established, report errors.

19. The license management system of claim 10, wherein each license management server of the plurality of license management servers correlates the license usage information from the update message with a number of licenses.

20. The license management system of claim 10, wherein information returned by the query is used to generate periodic reports comprising license utilization, license denial, project code usage, or business unit usage.

* * * * *